Jan. 31, 1933.  W. T. KENNEDY  1,895,853
ACTINOMETER
Filed Jan. 24, 1931  2 Sheets-Sheet 1

INVENTOR
WILLIAM T. KENNEDY
BY
ATTORNEY

Jan. 31, 1933.   W. T. KENNEDY   1,895,853
ACTINOMETER
Filed Jan. 24, 1931   2 Sheets-Sheet 2
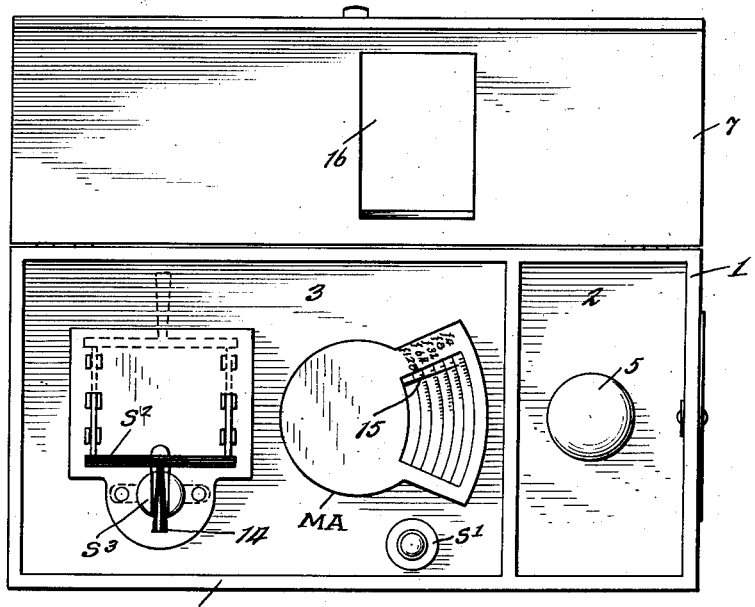
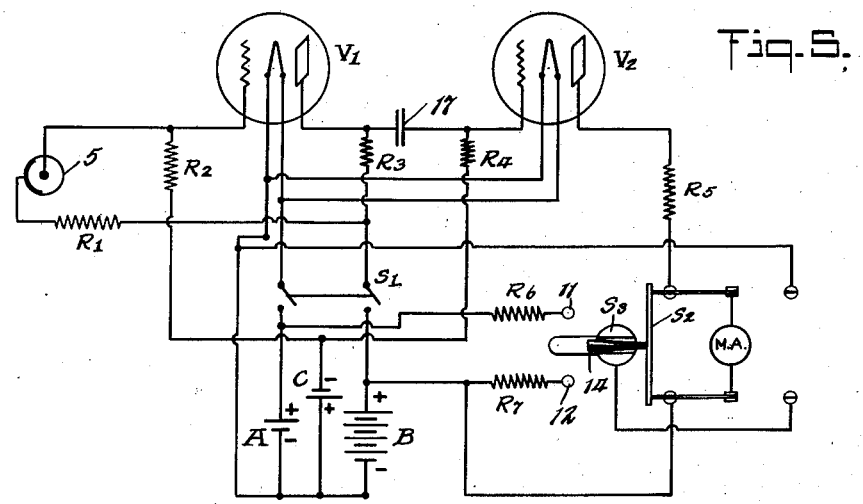
INVENTOR
WILLIAM T. KENNEDY
BY
ATTORNEY Patented Jan. 31, 1933

1,895,853

UNITED STATES PATENT OFFICE

WILLIAM THOMSON KENNEDY, OF NEW YORK, N. Y.

ACTINOMETER

Application filed January 24, 1931. Serial No. 510,970.

This invention relates to an improved form of actinometer that has for its main object provision of such a device which will provide a reliable, quick and exact measure of the overall illumination of the field of view which it is desired to record photographically either upon a photographic film or plate of any form.

The invention in its broadest aspect consists of an actinometer comprising a light sensitive element adapted to produce an electric current varying with the light intensity and a measuring device for such current produced. Preferably there is associated with the light sensitive element and the measuring device a current amplifying arrangement which may take the form of one or more thermionic tubes.

In accordance with one convenient and specific embodiment, I provide a photo-electric cell and a current measuring instrument, such as a milliammeter, and between these I interpose a thermionic tube amplifier arranged to amplify the current variations produced by the photo-electric cell in accordance with the light variations of the various fields of view.

Further objects and features of this invention will be apparent from the following description of one convenient embodiment thereof, reference being made to the accompanying drawings in which, Figure 1 is an exploded view in side elevation of an actinometer in accordance with this invention;

Figure 3 is a plan view with the covers removed;

Figure 5 is a wiring diagram showing the circuit arrangements of the various elements and components.

Figure 1:
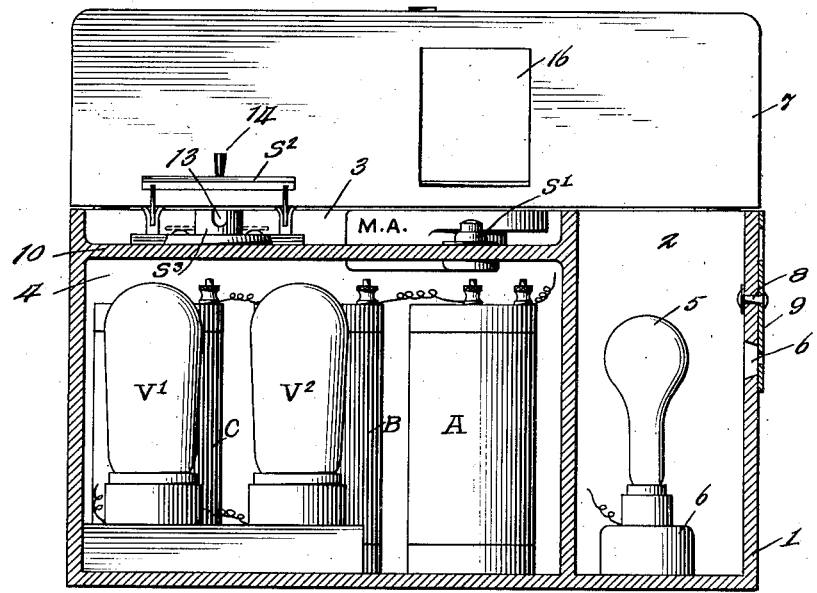

Referring to the drawings, the illustrated embodiment there shown comprises a box or container 1 divided up into three compartments, 2, 3 and 4 respectively. In the front compartment 2 there is placed a photo-electric cell 5 mounted upon a stand or base 6, and this compartment itself is totally enclosed and is light-sealed except for an aperture 6 in the front face of the box or container. The compartment itself has a lid 7 which, however, in normal use is closed. Upon the front face of the box, mounted upon a stud or spindle 8, is a rotatable disc 9 having a plurality of apertures of varying sizes adapted to register with the fixed aperture 6 in such a manner that rotation of the disc can bring any of the apertures therein opposite the aperture 6 and allow the passage therethrough of the desired amount of light. The apertures in the disc 9 are suitably related to the ordinary stops on a camera and are suitably identified as illustrated for example in Figure 4 where the range is from $f_4$ to $f_{128}$. It will be obvious, however, that this range of stops can be varied to suit any particular requirements and conditions. It will furthermore be obvious that in substitution of the rotatable disc an ordinary photographic iris diaphragm may be used, this being provided with the normal photographic stop indicators.

To the rear of the dark chamber 2 is an enclosed chamber 4 divided from the upper chamber 3 by a partition 10, and in this lower chamber there are placed two thermionic amplifying tubes $V_1$, $V_2$ and the requisite batteries for the amplifying circuit, the A, B and C batteries, which are indicated by their respective characters. The arrangement is such that the components in the chamber 4 provide an amplifying circuit in the input side of which is placed the photo-electric cell 5 as indicated in the wiring diagram of Figure 5 described hereinafter.

Figure 2:
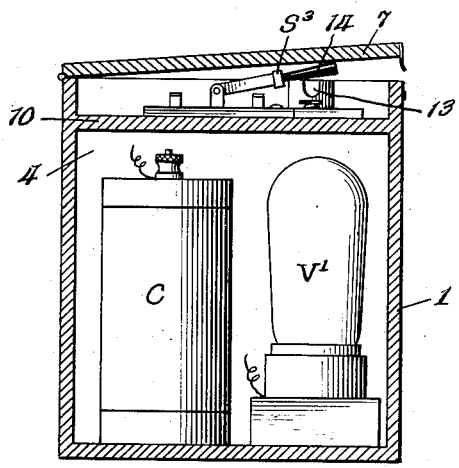
Figure 2 is a similar view in end elevation.

Mounted upon the partition is a suitable current measuring instrument comprising a milliammeter MA and three switches $S_1$, $S_2$, $S_3$. The switch $S_1$ comprises an ordinary push button switch which, as will be explained hereinafter in connection with Figure 5, renders the amplifying circuit operative. The switch $S_2$ comprises a double pole two-throw switch adapted to place the photo-electric cell in circuit or alternatively adapted to connect the operating batteries in circuit with the current indicator MA for testing purposes. The switch $S_3$ comprises a rotatable two-pole switch adapted to connect alternatively with studs 11 and 12 so as to select either the A or the B battery for testing purposes in the milliammeter circuit. The switch $S_3$ has formed therein a groove 13, and when the switch is in neutral position as illustrated in Figures 1 and 5, the handle 14 of the switch $S_2$ can rest within the groove 13. If, however, the switch $S_3$ is not in its neutral position the handle 14 cannot rest in the groove 13 and cannot therefore be completely depressed since it will abut against the central part of the switch $S_3$. An arrangement is shown in Figure 2 and it will be seen that by virtue of the handle 14 being not fully depressed the lid 7 which unless closed renders the device inoperative, cannot be completely shut down. It will thus be seen therefore that the switch $S_2$ must be thrown to its completely operative position before the device can be used. In other words, unless the switch $S_3$ has been moved from either of its testing positions, the operator cannot utilize the device in the manner prescribed.

Figure 4:
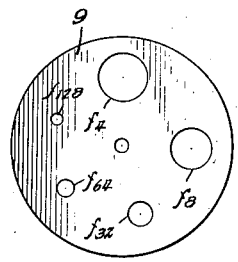
Figure 4 is a detail view.

The milliammeter may be of any suitable type having a rotatable pointer 15 moving over a plurality of scales which in Figure 3 are identified with the stop references applied to the apertures of the rotatable disc 9 as illustrated in Figure 4. Radially inside these various scales is a further scale marked in any arbitrary units which in this present instance have been adopted as 0 to 100. Each of the stop scales is marked with characters indicating certain exposures in accordance with the movement of the pointer and the general arrangement is that when the device is rendered operative the photo-electric cell will generate a current which is amplified and which is passed through the milliammeter whose pointer takes up a corresponding position from which the exposure can easily be determined from the scale appropriate to the stop opening.

Reference is now made to the circuit diagram of Figure 5 where it will be seen that the photo-electric cell 5 is in the input side of the tube $V_1$ and is connected through a resistance $R_1$ to the positive side of the B battery through the switch $S_1$. The switch $S_1$ also when operated closes the filament circuits which are energized by the A battery. It will be seen therefore that actuating of the switch $S_1$ renders the device operative or inoperative as required, and this operation merely entails the pressing of the press button which is available through the aperture 16 in the lid 7. Suitable resistances $R_2$, $R_3$, $R_4$ and $R_5$ are inserted in the grid and anode circuits of the tubes which are coupled together through the condenser 17. Connected to the respective positive poles of the A and B batteries are two further resistances $R_6$ $R_7$ and these may be connected at will through their respective contacts 11 and 12 with the switch $S_3$. Thus, by turning the switch $S_3$ on one or other of the contacts 11 and 12, the positive poles of the A and B batteries can be selected for insertion in the milliammeter circuit through the right-hand contacts of the two-pole double throw switch $S_2$ shown in Figure 5. When the switch $S_2$ is thrown to the right as shown in this figure, then the milliammeter is inserted according to whichever battery is selected by the switch $S_3$ and the mere pressing of the button of the switch $S_1$ will then give a reading upon the 0 to 100 scale of the milliammeter. The resistances $R_7$ $R_6$ are so chosen that this switching operation should give any arbitrary figure, say 50, on this scale if the batteries are in order. The operator, thus, by actuating the switches can quickly test whether the A and B batteries are up to their full voltage.

When the switch $S_2$ is thrown to the left as illustrated in Figure 5, the switch $S_3$ being in neutral position as shown, the milliammeter is in the anode circuit of the tube $V_2$ and thus the only further operation necessary is the pressing of the switch $S_1$ in order to obtain a reading on the milliammeter.

In actual operation the device can be used in conjunction with or can be actually combined with a photograph camera. The field of view is selected and the aperture opening is adopted by turning the disc 9. After the testing of the batteries the switch $S_3$ is turned to its neutral position and the switch $S_2$ is thrown to the right of Figure 5, the lid 7 is then closed and the button $S_1$ is pressed. This energizes the tube circuits and the milliammeter arm 15 swings to a definite position which indicates on the scale the requisite exposure according to whichever stop is adopted. If for instance the disc 9 is turned to stop $f_8$ then the exposure on the milliammeter is read off the $f_8$ scale.

It will thus be seen that there is provided in accordance with this invention an effective and standardized actinometer in accordance with which the required exposure for any field of view can easily be determined. The whole apparatus is suitably calibrated to cover a wide range of values and as stated above can be combined with the camera, if desired. Obviously any other form of amplifying device can be substituted for the tubes, and furthermore, the amplifying device can be dispensed with if it is found to be superfluous. It is furthermore obvious that the particular form of switches hereinbefore described may be varied according to any practical requirements that may have to be fulfilled. The above described embodiment in fact may be varied in all particulars in accordance with such requirements without departing from the spirit of the invention set out in the appended claims.

I claim:

1. An actinometer comprising a container having a lid, a photo-electric cell, a thermionic amplifier and current indicating means in said container, switching means being provided alternatively to test the batteries of said amplifier or connect said cell and said means in circuit with said amplifier and adapted to prevent the closure of said lid whilst in the testing position.

2. An actinometer comprising a container having a plurality of chambers and a lid and container, a photo-electric cell, a thermionic amplifier having batteries, and current indicating means, a pair of switches being provided one adapted to select one of said batteries, the other being adapted to place said selected battery in circuit with said current indicating means, said switches being arranged to prevent the closure of said lid whilst in the selected positions.

3. An actinometer comprising a container having an aperture, a photo-electric cell within said container and adapted to receive light through said aperture, a thermionic amplifier including a plurality of batteries and adapted to receive current from said cell, current measuring means adapted to receive current from said amplifier and to indicate exposure values in accordance with variations in the size of said aperture on a plurality of scales, one for each size of aperture, and a switching means adapted alternatively to select said batteries for testing or to connect said cell and current measuring means in the input and output circuits of said amplifier.

In testimony whereof I affix my signature.

WILLIAM THOMSON KENNEDY.